United States Patent [19]

Crull

[11] Patent Number: 4,701,088
[45] Date of Patent: Oct. 20, 1987

[54] UNDERCUT SEALING THREADED FASTENER

[75] Inventor: Russell L. Crull, Byron, Ill.

[73] Assignee: Textron Inc., Providence, R.I.

[21] Appl. No.: 795,616

[22] Filed: Nov. 6, 1985

[51] Int. Cl.$^4$ .............................................. F16B 33/00
[52] U.S. Cl. ...................................... 411/369; 411/533; 411/542
[58] Field of Search ............... 411/184, 187, 368, 369, 411/533, 542, 915

[56] References Cited

U.S. PATENT DOCUMENTS

| Re. 27,085 | 3/1971 | Weidner, Jr. . | |
|---|---|---|---|
| 2,167,559 | 7/1939 | Upson . | |
| 2,292,216 | 8/1942 | Doran | 411/915 |
| 2,751,806 | 6/1956 | Dickie . | |
| 2,752,814 | 6/1954 | Iaia . | |
| 3,062,557 | 11/1962 | Underwood | 277/272 |
| 3,087,370 | 4/1963 | Iaia . | |
| 3,175,454 | 3/1965 | Morse . | |
| 3,247,752 | 4/1966 | Greenleaf et al. . | |
| 3,399,589 | 9/1968 | Breed . | |
| 3,971,086 | 7/1976 | Stanaitis | 10/155 A |
| 4,310,273 | 1/1982 | Kirrish | 411/338 |

FOREIGN PATENT DOCUMENTS 659486 10/1951 United Kingdom ................ 411/369

Primary Examiner—Neill Wilson
Attorney, Agent, or Firm—Trexler, Bushnell, Giangiorgi & Bkackstone, Ltd.

[57] ABSTRACT

An undercut, sealing threaded fastener for engagement with an internally threaded workpiece, and a method of forming the same as provided. The fastener comprises a driver head and a shank extending axially from an undersurface of the driver head. The shank includes an intermediate unthreaded portion and a threaded portion defining a given thread form having a crest diameter and a given root diameter. An undercut groove is provided in the undersurface of the driver head, this undercut groove having an inner diameter no greater tha the crest diameter of the internal or female thread, and preferably also no greater than the root diameter of the external thread, and an outer diameter greater tha the crest diameter. An unthreaded shank portion is formed intermediate the threaded shank portion and the driver head and extends continuous with the inner diameter of the undercut groove. This unthreaded shank portion thus having an outer diameter no greater than the internal thread crest diameter and preferably not greater than the external thread root diameter. An annular sealing ring is engaged about the unthreaded shank portion and extends into the groove.

10 Claims, 4 Drawing Figures

UNDERCUT SEALING THREADED FASTENER

BACKGROUND OF THE INVENTION

This invention is directed generally to the fastener arts, and more particularly to a sealing threaded fastener having an undercut groove portion beneath a driver head for accommodating a sealing member, to accomplish sealing engagement with a threaded aperture in a workpiece.

Sealing fasteners in general are well-known in the art, and are particularly useful as sealing closures for apertures in metal plates or other surfaces such as in equipment housings or the like. For example, some outboard marine engines include a cast housing unit having a threaded drain opening therethrough and a counterbore preceding the opening. Heretofore, a threaded fastener having a polypropylene or similar flexible washer or "O-ring" assembled over the thread form was utilized as a drain plug. The polypropylene washer was intended to serve as a seal between the bearing surface of the screw (such as an undersurface of the driver head) and the facing inner-most or bottom-most surface of the counter-bore surrounding the drain opening.

It will be recognized that the flexible washer intermediate the bearing surface of the screw and the counterbore or other workpiece surface does not permit the bearing surface of the screw to seat positively in metal-to-metal contact with the facing surface of the workpiece. Hence, it is difficult for the installer, and thereafter during oil changes, to ascertain the correct amount of advancement of the plug for proper sealing. If there is too little advancement, the fastener can loosen during operation in response to engine vibration or the like and the seal could be lost due to such loosening. If there is too much advancement, the sealing ring, the threads or both can be damaged, resulting in inadequate sealing.

It is known to provide an undercut groove in the normally flat undersurface of the head to accommodate the sealing member. However, often such sealing members have tended to be extruded out between the screw and workpiece surface, in a process known as extruding "on the take-down face". This results in pinching of the O-ring between the screw and workpiece which can cause damage to the O-ring such that a reliable seal will no longer be maintained.

As an additional matter, conventional cold-forming or roll-forming threading operations generally produce an external screw thread in which one to one-and-one-half pitches of incomplete thread are formed in a "run out portion" adjacent the undersurface of the driver head, due to the inability to position the rolling die sufficiently close to the head and the requirement that the edge of the die exhibit a certain amount of rolling groove draft. More particularly, these incomplete threads present or result in an oversized root diameter which cannot accept the standard female or internal thread form. Accordingly, a conventional roll formed screw fastener cannot normally be advanced sufficiently to obtain metal-to-metal contact between the flat undersurface of the head and a facing workpiece surface. That is, the last one or one-and-one-half pitches of incomplete thread will not be able to enter the internally threaded aperture in a normal fashion. This is because the aperture is provided with complementary internal threads with a crest diameter sized to receive the root diameter of normal, fully-formed threads of the threaded fastener and not the above-mentioned incomplete threads having an over-sized root diameter.

Conventional roll-threaded fasteners are generally formed from a blank which has an initial or unthreaded shank diameter somewhere between the crest diameter and the root diameter of the finished thread to be formed thereon. Hence, the thread is formed essentially by displacing material from portions of the shank to define the thread root portions and moving this displaced material to adjacent portions of the shank to define the thread crest portions. Thus, any incompletely threaded portion of the shank adjacent the undersurface of the head is necessarily of a greater root diameter than the finished thread portion and will be too great in diameter to advance into an internally threaded aperture sized for receiving the finished threads.

OBJECTS AND SUMMARY OF THE INVENTION

Accordingly, it is a general object of the invention to provide a novel and improved undercut sealing threaded fastener which substantially avoids the foregoing problems.

A more particular object is to provide an undercut sealing threaded fastener which maintains metal-to-metal sealing between the fastener head bearing surface and workpiece surface while also maintaining a reliable seal therebetween.

A related object is to provide a threaded fastener in accordance with the foregoing object which may readily be seated relative to a workpiece without the necessity of further provision of a chamfer or counterbore or other clearance for incomplete fastener threads in the workpiece.

A related object is to provide an undercut sealing threaded fastener in accordance with the foregoing objects which is relatively simple and inexpensive in its manufacture and yet highly reliable in operation.

Briefly, and in accordance with the foregoing objects, an undercut threaded fastener in accordance with the invention comprises a driver head and a threaded shank extending from an undersurface of the driver head and defining a given thread crest diameter and a given thread root diameter and a given thread pitch diameter; an undercut groove in said undersurface of said driver head having an inner diameter no greater than the thread crest diameter of a mating female-type thread, and an outer diameter greater than said thread crest diameter; and an unthreaded shank portion intermediate the threaded shank and the driver head and extending continuously from said inner diameter of the undercut groove, such that the unthreaded shank portion has an outer diameter no greater than the thread crest diameter of the mating female thread.

In accordance with another aspect of the invention there is provided a method of forming an undercut threaded fastener having a thread of given desired crest and root diameters comprising the steps of; providing a fastener blank having a driver head portion with a flat undersurface and a shank portion of a predetermined first outer diameter intermediate the given root and crest diameters of the thread to be formed thereon and extending from said flat undersurface; forming a first shank portion of a second lesser outer diameter in a part of said shank portion extending a predetermined axial distance outwardly of said flat undersurface; selecting said second lesser outer diameter to be less than the crest diameter of the female thread to be engaged with the fastener, and preferably less than the root diameter of the external thread to be forced on said shank forming a generally annular undercut groove in said undersurface of said head having an inner diameter substantially the same as and continuous with the outer diameter of said intermediate shank portion, said groove having a sufficient outer diameter for receiving an annular seal member therebetween; and forming a thread having said given root and crest diameters upon the remainder of said shank portion.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENT

Figure 4:
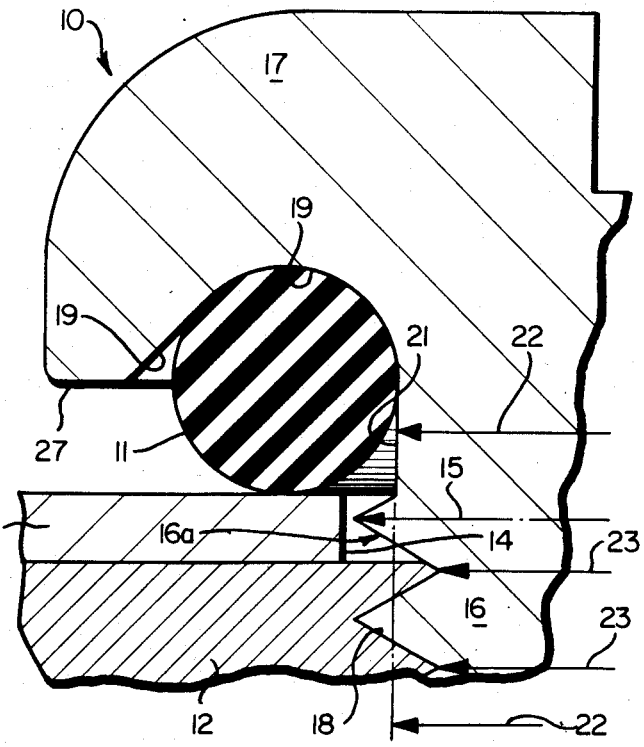
FIG. 4 is an enlarged sectional view similar to FIG. 2 illustrating a threaded fastener in accordance with a prior art construction.

Referring now to the drawings, and initially to FIG. 4, an undercut sealing threaded fastener 10 in accordance with a prior art construction will first be described. The fastener 10 illustrated in FIG. 4 is substantially identical to the fastener construction shown in U.S. Pat. No. 3,175,454 to Morse, to which reference is also invited. It should be noted that the drawings of the Morse patent illustrate an inoperative fastener arrangement, as the fastener as shown in FIG. 4 of the present drawing could not be advanced to fully seat the abutment surface of the head portion, as interference with the female thread would occur prior to attainment of a fully seated engagement. Morse is, however, illustrated of the best prior art known to Applicant.

The fastener 10 is shown in connection with a workpiece 12 and a plate 13 overlying the workpiece 12. As described in the above-referenced Morse patent, the fastener is intended to seal with an opening 14 in this latter plate or other surface 13. It will be noted that the opening 14 is of a greater dimension than the major thread diameter 15 of the threaded shank portion 16 of the fastener 10. In this regard, the fastener 10 also includes an enlarged driver head portion 17. The threaded shank portion 16 engages a complementary internally threaded aperture 18 in the workpiece 12.

In order to provide sealing, the fastener 10 employs an annular, and preferably toroidal O-ring 11, which is engaged about an annular recess 19 in an undersurface of the driver head 17. As disclosed, the cross-section of this recess 19 is asymmetrical. However, it will be noted that an innermost surface of this recess 19, as indicated at reference numeral 21, defines a diameter 22 greater than the minor or root diameter 23 of the threaded shank 16 and also greater than the crest diameter of the female thread 18 on workpiece 12. Accordingly, it will be seen that advancement of the threaded fastener 10 with respect to the aperture 18 of workpiece 12 is limited by this diameter 22. That is, the fastener 10 cannot be advanced relative to aperture 18 farther than the last fully formed thread on shank 16. The partially formed thread turn above the last fully formed thread 16 is designated 16a, and is termed the "thread run out".

Moreover, as is more fully illustrated in the above-referenced patent to Morse, the prior art arrangement of FIG. 4 tends to result in the extrusion or forcing of some portion of O-ring 11 into the space between the inner wall of aperture 14 and the facing surface 21 or thread form 16. This can cause pinching and damage to the washer and detract from the sealing engagement thereof with the surface or plate 13, especially upon repeated removal and replacement of the fastener 10, such as would be done with a drain plug or the like. Also, as mentioned above, the thread 18 will bind or interfere with the thread run out 16a such that fully seated engagement, with the abutment or undersurface 27 of the head 10 engaging plate 13, most probably cannot be attained. As such, the gadget 11 will also be extruded radially outward between said surfaces preventing a metal-to-metal seal. Thus, while the head 17 of this prior art form may be engaged with a plate 13, depending upon its thickness, the head 17 cannot be engaged with the female threaded component 12.

Figure 1:
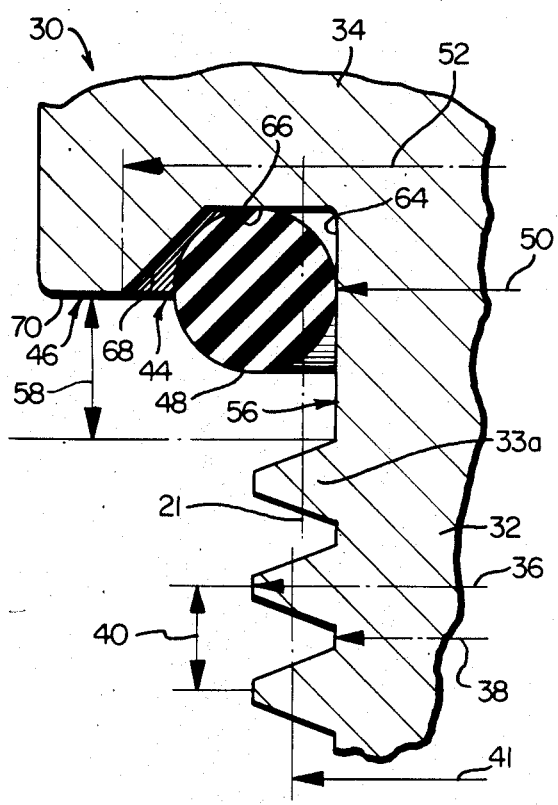
FIG. 1 is an enlarged partial sectional view through an undercut sealing threaded fastener in accordance with the invention.
Figure 2:
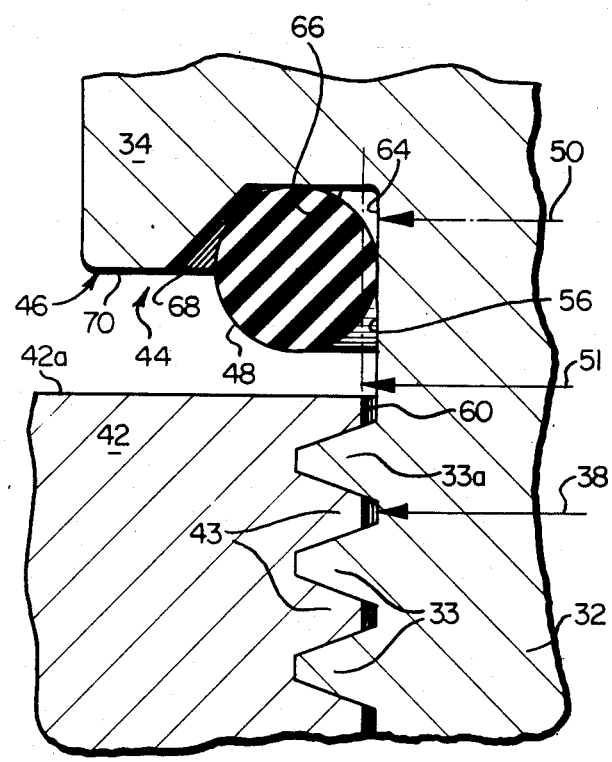
FIG. 2 is a sectional view similar to FIG. 1 and illustrating initial advancement of the threaded fastener of the invention relative to a workpiece.
Figure 3:
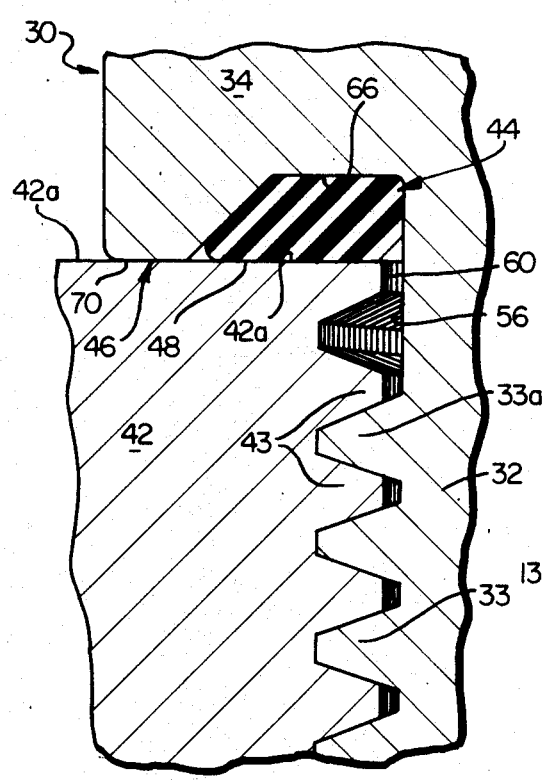
FIG. 3 is a sectional view similar to FIGS. 1 and 2 and illustrating full advancement of the threaded fastener of the invention relative to the workpiece for both positive seating thereupon and sealing therewith.

Turning now to FIGS. 1 through 3, a novel undercut sealing threaded fastener in accordance with the invention, which avoids the problems of the prior art device of FIG. 4 will now be described. The threaded fastener in accordance with the invention is indicated generally by reference numeral 30. It will be noted that FIGS. 1 through 3 illustrate fastener 30 in a partial, sectional view, it being understood that the full fastener 30 is generally of an overall configuration including an elongated shank 32 which extends axially from an enlarged driver head portion 34 of a generally circular configuration. The shank 32 has thread turns 33 thereon which define a given major or thread crest diameter indicated generally by reference numeral 36 and a given minor or thread root diameter indicated by reference numeral 38. The thread thus defined also defines a given thread pitch as indicated generally by reference numeral 40, and a pitch diameter included at 41.

The head portion 34 includes a groove 49 defined in the undersurface 46 thereof. Disposed within this groove 44 is an annular flexible sealing member 48 of the O-ring type. The groove 44 is defined by an inner annular surface 64, an axially facing base surface 66 and a frusto-conical radially outward annular wall surface 68. Further, it should be noted that the unthreaded portion 56 of the shank 32 has been relieved such that the last thread turn 33 thereon is a full and complete thread.

As can be seen in FIGS. 2 and 3 the fastener 30 is engaged with a workpiece 42 having a threaded aperture including female threads 43 thereon. In practice, as shown in FIG. 3, the head 34 of the fastener 30 and more specifically the undersurface 46 thereof is brought into surface-to-surface, metal-to-metal control with the upper surface 42a. In addition, the seal 48 is compressed between said surface 42a and the annular base surface 66 of the groove. Preferably, the depth of the groove 44 is selected such that the volume thereof upon seated engagement does not exceed materially the volume of the O-ring 48, so that the O-ring 48 will not be extruded axially between the female threads 43 and the unthreaded shank portion 56.

In accordance with the invention, the inner surface 64 of the undercut groove 44 has a diameter indicated by reference numeral 50 which is less than the crest diameter 51 of the female thread 43, and in the illustrated embodiment, also less than the root diameter 38 of the thread 33 or shank 32. In the illustrated embodiment, this inner diameter 50 of surface 64 is substantially equal to the root diameter 38. An outer diameter 52 of this undercut groove 44 is much greater than the crest diameter, and exceeds the outer diameter of the sealing ring 48 therewithin. Referring more particularly to the preferred configuration of undercut groove 44 illustrated in the drawings, it will be seen that a substantially flat base or end wall surface 66 of a generally annular configuration is also defined recessed within the fastener head 34. Preferably, this base or end wall surface is substantially parallel with the flat undersurface 46. Finally, the generally frusto-conical radially outer wall surface 68, converges in the direction of the end wall 66, preferably the angle of this frusto-conical surface 68 is substantially in the order of 45 degrees relative to the axial direction defined by the shank 32.

Importantly, the unthreaded shank portion 56 is provided intermediate the threaded portion of shank 32, and the undercut groove 44. This unthreaded shank portion 56 extends continuously from surface 64 defining the inner diameter 50 of the undercut groove to define therewith a continuous, generally cylindrical unthreaded surface. Hence, unthreaded shank portion 56 in the illustrated embodiment has a diameter no greater than and preferably equal to the minor thread diameter or root diameter 38 and less than the crest diameter 51 of threads 33. Preferably, the effective axial extent of this unthreaded shank portion 56, as indicated by reference numeral 58, is at least as great as the axial length of the thread pitch 40, and preferably on the order of 1.5 times this thread pitch 40.

By way of comparison with the prior art construction of FIG. 4, the dashed line 21, FIG. 1, illustrates the relative position of the inner surface of the annular groove as provided in the prior art fastener 10 of FIG. 4, that is, relative to the surface 64 and diameter 50 as described above. Hence, since the last thread 33a is a full and complete thread, and the unthreaded shank portion 56 has a diameter less than the crest diameter 51 of thread 43, it will be seen that this unthreaded shank portion 56 may freely advance relative to a complementary workpiece opening 60, defined by threads 43. This permits full advancement of the fastener 30 relative to the workpiece 42 for both sealingly engaging the sealing ring 48 therebetween and for assuring metal-to-metal contact between the undersurface 46 of the head 34 and the facing surface 42a of the workpiece 42. The metal-to-metal engagement serves a number of functions in that not only does it provide a seal, but also an indication that full seat engagement has been obtained. Further, the metal-to-metal contact will prevent loosening of the fastener 30 due to vibrations.

The sealing ring 48, as previously mentioned, is preferably a torus in form and defines a volume slightly greater than the volume defined by the undercut groove 44. The volume of sealing ring 48 is selected so as to assure that the ring is compressed for substantially filling the groove 44 when the fastener is fully advanced relative to the workpiece as illustrated in FIG. 3. However, the volume of the sealing ring is also preferably not so great as to cause the material of the sealing ring to extrude between the fastener and the workpiece, or to "extrude on the take-down face" by becoming pinched between the screw head 34 and the casting or workpiece 42.

As best viewed in FIG. 3 then, the foregoing considerations assure that the sealing ring 48 will be compressed to form a seal about the entrance to the threaded through opening 60 in the workpiece 42. Moreover, it will be noted that the provision of the same reduced diameter 50 for both the undercut groove 44 and unthreaded shank portion 56 allows advancement of the threaded shank 32 relative to the threaded aperture 60 so as to allow metal-to-metal contact between the upper surface 42a of the workpiece 42 and the undersurface 46 of the driver head 34. In this regard, preferably some radially outer, annular flat surface portion 70 of the undersurface 46 remains radially surrounding the undercut groove 44 to achieve this metal-to-metal contact.

In accordance with a preferred form of the invention, the sealing ring 48 comprises an elastomeric rubber-like material. More particularly, the material of sealing ring 48 preferably comprises a neoprene material of durometer hardness of substantially on the order of 70.

The undercut, sealing threaded fastener as described above may be formed by a method comprising initially providing a fastener blank having a driver head portion with a flat undersurface and a shank portion of a given, unthreaded, outer diameter extending axially from the flat undersurface. The predetermined or given outer diameter of this unthreaded shank is intermediate the desired root and crest diameters of the thread of the completed, threaded fastener.

The method of formation proceeds by next forming the intermediate shank portion 56 which is achieved by a metal removal process, such that the diameter 51 of section 50 is no greater than the desired crest diameter of the finished female thread to be engaged therewith. Also, diameter 51 may be selected to be no greater than the root diameter of the thread 33 to be formed on shank 32. Further, the axial length of portion 56 is selected to extend an axial distance preferably equal to about one to 1.5 times the thread pitch length of the finished threaded fastener. Next, the undercut groove 44 is formed in the undersurface of the head, so as to define inner diameter 50 as previously mentioned and an outer, preferably frusto-conical wall surface 68 which defines an outer diameter much greater than the crest diameter of the finished threaded shank. Finally, the thread is formed as by roll-forming or similar operations on the unthreaded and unrelieved portion of shank 32 to result in a thread 33 having the given, desired root and crest diameters upon the remainder of the shank 32, that is, away from unthreaded intermediate shank portion 56. In this regard, it will be noted that due to the prior relieving of the shank portion 56 and its extension away from the head 34 by a distance at least equal to the pitch 40, no thread run-out results, and the last thread 33a on the shank is a full and complete thread.

Having thus formed the undercut, sealing fastener, the annular sealing member 48 may be engaged about the intermediate shank portion and extending into the undercut groove. Preferably, the foregoing method also contemplates simultaneously forming the intermediate shank portion 56 and the undercut groove 44, preferably by a shaving or similar operation.

It is intended that the present invention not be limited to the precise details of the prefered form illustrated and described above. In this regard, it is envisioned that those skilled in the art and possessed of this disclosure may devise various and obvious modifications without departing from the spirit and scope of the invention as defined by the claims appended hereto.

The invention is claimed as follows:

1. An undercut, sealing externally threaded fastener for engagement with a workpiece including an internally threaded aperture for receiving said externally threaded fastener, said fastener comprising a head portion having a substantially flat undersurface, and a shank portion extending axially from the undersurface of said head portion, said shank having an externally threaded portion and an unthreaded portion disposed intermediate said externally threaded portion and said head portion, said threaded portion defining a thread form including a predetermined root and crest diameter and a given thread pitch; said head portion including a groove formed in the undersurface thereof and an annular flat surface portion disposed radially outward of said groove, and said groove having an inner diameter less than the crest diameter of the female thread on said workpiece; the unthreaded shank portion extending from the inner diameter of said groove and being formed continuous with said inner diameter of said groove and having an outer diameter less than the crest diameter of said female thread; and an annular sealing ring disposed in said groove, such that due to said groove and said unthreaded shank portion having a diameter less than the crest diameter of said female thread, said fastener may be fully seated in said workpiece to bring the annular flat surface portion of said head portion into surface-to-surface contact with the workpiece, and the volumes of the sealing ring and the groove being selected such that said sealing ring will be deformed and substantially fill said groove without extruding material between the flat surface portion of the fastener and the workpiece nor axially between the female thread and the shank portion when said surface-to-surface contact is attained.

2. A fastener according to claim 1 wherein said unthreaded shank portion has an axial extent at least as great as the axial length of said given thread pitch.

3. A fastener according to claim 1 wherein said sealing ring defines a torus.

4. A fastener according to claim 1 wherein said sealing ring comprises an elastomeric material.

5. A fastener according to claim 4 wherein said sealing ring comprises a neoprene material of durometer hardness of substantially on the order of 70.

6. A fastener according to claim 1 wherein said undercut groove defines a substantially cylindrical radially inner wall surface, a substantially flat end wall surface recessed within said fastener head and a frusto-conical radially outer wall surface, said outer wall surface converging in the direction of said end wall at an angle of substantially on the order of 45 degrees relative to the axial direction.

7. A fastener according to claim 2 wherein the axial extent of said unthreaded shank portion is substantially 1.5 times said given thread pitch.

8. In combination, an undercut, sealing externally threaded fastener and a workpiece to which said fastener is to be engaged, said workpiece including an internally threaded aperture for receiving said externally threaded fastener, said fastener comprising a head portion having a substantially flat undersurface, and a shank portion extending axially from the undersurface of said head portion, said shank having an externally threaded portion and an unthreaded portion disposed intermediate said externally threaded portion and said head portion, said threaded portion defining a thread form including a predetermined root and crest diameter and a given thread pitch; said head portion including a groove formed in the undersurface and an annular flat surface portion disposed radially outward of said groove, and said groove having an inner diameter less than the crest diameter of the female thread on said workpiece; the unthreaded shank portion extending from the inner diameter of said groove and being formed continuous with said inner diameter of said groove and having an outer diameter less than the crest diameter of said female thread; and an annular sealing ring disposed in said groove, such that due to said groove and said unthreaded shank portion having a diameter less than the crest diameter of said female thread, said fastener may be fully seated in said workpiece to bring the annular flat surface portion of said head portion into surface-to-surface contact with said workpiece to attain a metal-to-metal seal, and the volumes of the sealing ring and the groove being selected such that said sealing ring is deformed and compressed to provide an additional seal between said fastener and the workpiece, without extruding the seal between the flat surface portion of the fastener head and the workpiece upon attainment of the metal-to-metal seal.

9. The combination according to claim 8, wherein said unthreaded shank portion extends for a distance at least equal to the thread pitch so that the external thread turns on said fastener adjacent said unthreaded portion is a full and complete thread turn.

10. The combination according to claim 8, wherein said unthreaded shank portion has an axial extent at least as great as the pitch of the external thread.

* * * * *